(12) United States Patent
Narita

(10) Patent No.: US 10,803,597 B2
(45) Date of Patent: Oct. 13, 2020

(54) IMAGE PROCESSING DEVICE, METHOD FOR CONTROLLING THE SAME, PROGRAM, AND STORAGE MEDIUM

(71) Applicant: CANON KABUSHIKI KAISHA, Tokyo (JP)

(72) Inventor: Yu Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 15/909,708

(22) Filed: Mar. 1, 2018

(65) Prior Publication Data

US 2018/0260961 A1 Sep. 13, 2018

(30) Foreign Application Priority Data

Mar. 9, 2017 (JP) ................................. 2017-045250

(51) Int. Cl.
*G06T 7/20* (2017.01)
*G06K 9/48* (2006.01)
*H04N 5/232* (2006.01)
*G06K 9/32* (2006.01)
*G06K 9/46* (2006.01)
*G06T 7/246* (2017.01)
*G06K 9/62* (2006.01)

(52) U.S. Cl.
CPC ............. *G06T 7/20* (2013.01); *G06K 9/3233* (2013.01); *G06K 9/4609* (2013.01); *G06K 9/481* (2013.01); *G06T 7/246* (2017.01); *H04N 5/232* (2013.01); *G06K 9/4671* (2013.01); *G06K 2009/3291* (2013.01); *G06K 2009/6213* (2013.01); *G06T 2207/10016* (2013.01); *G06T 2207/10024* (2013.01); *G06T 2207/20021* (2013.01); *G06T 2207/30241* (2013.01)

(58) Field of Classification Search
CPC . G06T 7/20; G06T 7/246; G06T 2207/30241; G06T 2207/20021; G06T 2207/10024; G06T 2207/10016; G06K 9/4609; G06K 9/3233; G06K 9/481; G06K 2009/6213; G06K 2009/3291; G06K 9/4671; H04N 5/232
See application file for complete search history.

(56) References Cited

U.S. PATENT DOCUMENTS 8,515,180 B2 * 8/2013 Kato ................... G06K 9/00281
382/195
8,594,433 B2 * 11/2013 Yamazoe ................ G06T 7/251
382/190

(Continued)

FOREIGN PATENT DOCUMENTS

JP 2007334625 A 12/2007
JP 2016152027 A 8/2016

*Primary Examiner* — Xuemei G Chen
(74) *Attorney, Agent, or Firm* — Canon U.S.A., Inc. IP Division

(57) ABSTRACT

A circuitry of an image processing device divides a first image into a plurality of regions, extracts a feature point from each of the regions, tracks the feature point among a plurality of images to detect a motion vector, estimates a notable target of the first image, calculates the priority level of setting of a tracking feature point for each of the regions for tracking motion of the notable target, and sets the tracking feature point to any of the regions based on the priority level.

15 Claims, 17 Drawing Sheets

(56) References Cited

U.S. PATENT DOCUMENTS

| | | | | |
|---|---|---|---|---|
| 8,891,828 B2* | 11/2014 | Okada | ................ | G06K 9/00805 |
| | | | | 382/103 |
| 9,269,134 B2* | 2/2016 | Minato | ................ | G06T 7/0004 |
| 9,277,129 B2* | 3/2016 | Klivington | ......... | H04N 5/23267 |
| 9,466,095 B2* | 10/2016 | Ryu | ........................ | G06T 5/003 |
| 9,521,317 B2* | 12/2016 | Yu | ..................... | H04N 5/23229 |
| 9,747,523 B2* | 8/2017 | Yamamoto | ......... | G06K 9/00342 |
| 9,760,999 B2* | 9/2017 | Sakata | .............. | H04N 5/23229 |
| 9,942,477 B2* | 4/2018 | Sakaida | ............. | H04N 5/23254 |
| 9,990,534 B2* | 6/2018 | Kakita | ................ | G06K 9/6218 |
| 10,169,880 B2* | 1/2019 | Homma | ................. | G06T 7/246 |
| 10,210,619 B2* | 2/2019 | Narita | .................... | G06T 7/248 |
| 10,257,437 B2* | 4/2019 | Kajimura | ................ | G06T 5/003 |
| 10,311,595 B2* | 6/2019 | Kawamura | ............... | G06T 7/73 |
| 2005/0196017 A1* | 9/2005 | Altherr | .................. | G06T 7/246 |
| | | | | 382/103 |
| 2008/0107307 A1* | 5/2008 | Altherr | ............. | H04N 5/23248 |
| | | | | 382/107 |
| 2012/0014565 A1* | 1/2012 | Akiyama | ................ | G06T 7/246 |
| | | | | 382/106 |
| 2012/0014605 A1* | 1/2012 | Yamazoe | ................ | G06T 7/251 |
| | | | | 382/190 |
| 2013/0022277 A1* | 1/2013 | Morishita | ................ | G06K 9/03 |
| | | | | 382/201 |
| 2014/0105460 A1* | 4/2014 | Sakata | .............. | H04N 5/23219 |
| | | | | 382/103 |
| 2014/0347513 A1* | 11/2014 | Kobayashi | ......... | H04N 5/23229 |
| | | | | 348/222.1 |
| 2015/0117539 A1* | 4/2015 | Kobayashi | ........... | H04N 19/176 |
| | | | | 375/240.16 |
| 2015/0187076 A1* | 7/2015 | Lin | .......................... | H04N 7/15 |
| | | | | 382/103 |
| 2015/0379368 A1* | 12/2015 | Shiiyama | .............. | G06F 16/434 |
| | | | | 382/201 |
| 2016/0239950 A1* | 8/2016 | Miyasa | .................... | G06T 7/337 |
| 2016/0323526 A1* | 11/2016 | Washisu | ............. | H04N 5/23212 |
| 2017/0220816 A1* | 8/2017 | Matusek | ............. | G06F 21/6245 |
| 2018/0225840 A1* | 8/2018 | Ikeda | ..................... | H04N 5/232 |
| 2019/0019062 A1* | 1/2019 | Fukui | ................. | G06K 9/00791 |
| 2019/0294888 A1* | 9/2019 | Jones | ................... | G06K 9/6247 |

* cited by examiner

☐ FEATURE EXTRACTION REGION
▨ PERIPHERAL REGION
● FEATURE POINT

FIG. 9

| CAMERA INFORMATION / NOTABLE TARGET | | MORE FOCUSED ON BACKGROUND | MORE FOCUSED ON OBJECT |
|---|---|---|---|
| IMAGE CAPTURING MODE | | LANDSCAPE (0.9/0.1) | PORTRAIT (0.1/0.9) |
| MAIN OBJECT INFORMATION | HUMANITY | LOW (0.7/0.3) | HIGH (0.3/0.7) |
| | SIZE | SMALL (0.8/0.2) | LARGE (0.2/0.8) |
| | MOTION | GREAT (0.6/0.4) | SMALL (0.4/0.6) |
| SHUTTER SPEED | | SLOW (0.7/0.3) | FAST (0.3/0.7) |

*NUMERICAL VALUES IN PARENTHESES INDICATE EXAMPLE OF BACKGROUND LEVEL/OBJECT LEVEL

FIG. 13A

| 0 ∘ | 1 ∘ | 2 ∘ ∘ ∘ |
|---|---|---|
| ×4 | 5 ∘ | 6 ∘ |
| ×8 | 9 × | ×10 |

FIG. 13B

| | ×4 | 5 ∘ |
|---|---|---|
| | ×8 | 9 × |
| | | |

FIG. 13C

| 1 | 2 | 1 |
|---|---|---|
| 2 | 4 | 2 |
| 1 | 2 | 1 |

FIG. 14A

| REGION ID | 0 | 1 | 2 | 3 | 4 | 5 | 6 | 7 | 8 | 9 | 10 | 11 |
|---|---|---|---|---|---|---|---|---|---|---|---|---|
| EVALUATION VALUE | 14 | 19 | 23 | 18 | 9 | 12 | 14 | 11 | 8 | 7 | 7 | 8 |

FIG. 14B

| REGION ID | 9 | 10 | 8 | 11 | 4 | 7 | 5 | 0 | 6 | 3 | 1 | 2 |
|---|---|---|---|---|---|---|---|---|---|---|---|---|
| EVALUATION VALUE | 7 | 7 | 8 | 8 | 9 | 11 | 12 | 14 | 14 | 18 | 19 | 23 |

| REGION ID | 0 | 1 | 2 | 3 | 4 | 5 | 6 | 7 | 8 | 9 | 10 | 11 |
|---|---|---|---|---|---|---|---|---|---|---|---|---|
| EVALUATION VALUE | 966 | 610 | 364 | 461 | 901 | 502 | 112 | 304 | 934 | 559 | 269 | 391 |

| REGION ID | 6 | 10 | 7 | 2 | 11 | 3 | 5 | 9 | 1 | 4 | 8 | 0 |
|---|---|---|---|---|---|---|---|---|---|---|---|---|
| EVALUATION VALUE | 112 | 269 | 304 | 364 | 391 | 461 | 502 | 559 | 610 | 901 | 934 | 966 |

| REGION ID | 0 | 1 | 2 | 3 | 4 | 5 | 6 | 7 | 8 | 9 | 10 | 11 |
|---|---|---|---|---|---|---|---|---|---|---|---|---|
| NUMBER OF TIMES OF SUCCESSFUL TRACKING | 5 | 2 | 4 | 1 | 0 | 5 | 6 | 0 | 0 | 0 | 0 | 0 |
| EVALUATION VALUE GAIN | 0.5 | 0.8 | 0.7 | 0.9 | 1.0 | 0.5 | 0.4 | 1.0 | 1.0 | 1.0 | 1.0 | 1.0 |

| REGION ID | 0 | 1 | 2 | 3 | 4 | 5 | 6 | 7 | 8 | 9 | 10 | 11 |
|---|---|---|---|---|---|---|---|---|---|---|---|---|
| EVALUATION VALUE | 7 | 15.2 | 16.1 | 16.2 | 9 | 6 | 5.6 | 11 | 8 | 7 | 7 | 8 |

| REGION ID | 6 | 5 | 0 | 9 | 10 | 8 | 11 | 4 | 7 | 1 | 2 | 3 |
|---|---|---|---|---|---|---|---|---|---|---|---|---|
| EVALUATION VALUE | 5.6 | 6 | 7 | 7 | 7 | 8 | 8 | 9 | 11 | 15.2 | 16.1 | 16.2 |

# IMAGE PROCESSING DEVICE, METHOD FOR CONTROLLING THE SAME, PROGRAM, AND STORAGE MEDIUM

BACKGROUND OF THE INVENTION

Field of the Invention

The present invention relates to an image processing device, and an image processing method, configured to track a feature point among multiple frame images.

Description of the Related Art

In some cases, blurring of an object image is caused due to "shaking" of a user holding a camera body portion upon image capturing by an imaging device such as a digital camera. For correcting image blurring due to "shaking," a change in the position and orientation of the imaging device needs to be detected. A self-location estimation method for detecting the orientation and position of the imaging device has been known. This is the technique of applying well-known structure from motion (SFM) and a position orientation estimation (visual and inertial sensor fusion) technique using an inertial sensor to estimate the three-dimensional position of an object in an actual space and the position and orientation of the imaging device.

In this technique, multiple identical feature points are tracked among multiple images from different view points, and the three-dimensional coordinates of the feature points are calculated using a triangulation principle. In this manner, the three-dimensional position of the object and the position and orientation of the imaging device are estimated.

Feature point tracking can be implemented in such a manner that a motion vector of the feature point extracted from the image is sequentially detected for continuous multiple frame images. In feature point tracking, the tracked feature point might disappear to the outside of the angle of view, or might be hidden behind some kind of object. For this reason, tracking might be failed due to disappearance of the feature point. In a case where the number of feature points targeted for tracking decreases due to such unsuccessful tracking, another feature point needs to be set (compensated) as a tracking target.

Japanese Patent Laid-Open No. 2007-334625 discloses the technique of compensating feature points such that the feature points are uniformly distributed across a screen. Japanese Patent Laid-Open No. 2016-152027 discloses the technique of predicting the position of a disappeared feature point to compensate for a feature point at the predicted position.

Preferable distribution of the feature points targeted for tracking on the screen varies according to an intended use of a feature point tracking result. Assuming an intended use such as image stabilization or three-dimensional restoration of a scene, motion across the entirety of the screen needs to be detected, and it is preferable that the feature points are uniformly distributed across the screen. On the other hand, for an intended use of motion detection of the object, a detection target is the object, and therefore, it is preferable that the feature points are concentrated at the periphery of the object. As described above, in feature point tracking, distribution of the feature points targeted for tracking needs to be properly changed according to the intended use.

However, in the techniques disclosed in Japanese Patent Laid-Open No. 2007-334625 and Japanese Patent Laid-Open No. 2016-152027, the feature points targeted for tracking are constantly set according to a certain rule regardless of an image capturing status. Thus, there is a problem that distribution of the feature points targeted for tracking cannot be set only in a state suitable for a specific intended use.

As described above, in Japanese Patent Laid-Open No. 2007-334625, setting is made such that the feature points are uniformly distributed across the screen. Thus, such a technique is suitable for an intended use such as image stabilization or three-dimensional restoration of a scene, but is not suitable for the intended use of motion detection of the object. On the other hand, in Japanese Patent Laid-Open No. 2016-152027, even in a case where the feature point disappears due to movement of the object, the position of such disappearance is predicted for setting of the feature point. Thus, such a technique is suitable for the intended use of motion detection of the object, but is not suitable for an intended use such as image stabilization or three-dimensional restoration of a scene.

SUMMARY OF THE INVENTION

According to an aspect of the present invention, an image processing device is configured so that preferable feature point tracking can be implemented according to an image capturing status.

According to another aspect of the present invention, an image processing device includes circuitry configured to divide a first image into a plurality of regions, extract a feature point from each of the regions, track the feature point among a plurality of images to detect a motion vector, estimate a notable target of the first image, calculate a priority level of setting of a tracking feature point for each of the regions for tracking motion of the notable target, and set the tracking feature point to any of the regions based on the priority level.

Further features of the present invention will become apparent from the following exemplary embodiments (with reference to the attached drawings).

BRIEF DESCRIPTION OF THE DRAWINGS

FIG. 9 is a table of a relationship between camera information and a notable target.

FIGS. 13A and 13B are views of distribution of the successfully-tracked feature points in a notable region and peripheral regions of the notable region, and FIG. 13C is a view of an example of weighting in weighted addition.

FIG. 14A is a table for describing evaluation values before sorting in a case where the notable target is the background, and FIG. 14B is a table for describing the evaluation values after sorting.

DESCRIPTION OF THE EMBODIMENTS

Hereinafter, exemplary embodiments of the present invention will be described in detail with reference to the attached drawings.

First Exemplary Embodiment

Figure 1:
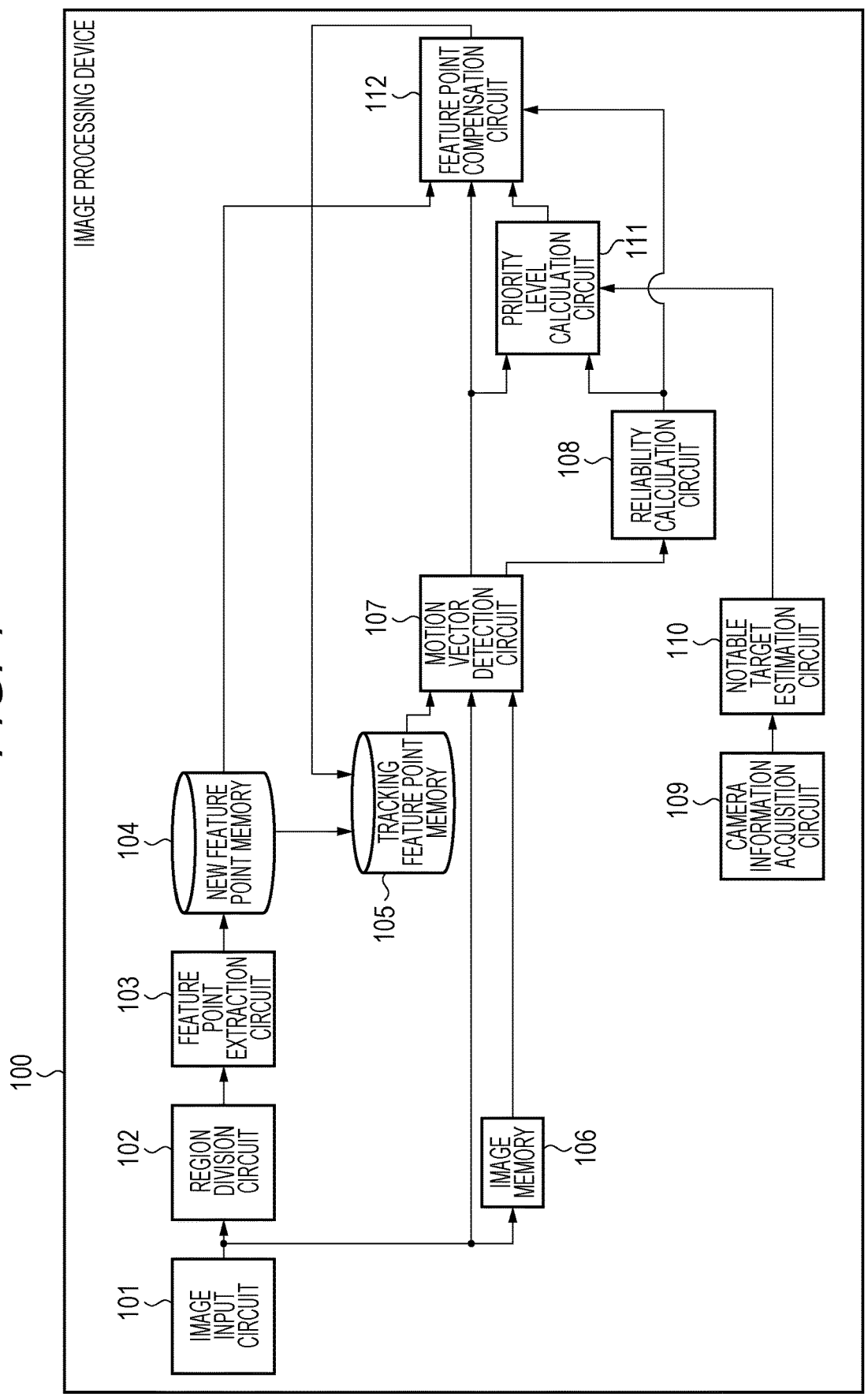
FIG. 1 is a block diagram of a configuration of an imaging device according to a first exemplary embodiment of the present invention.
Figure 3A:
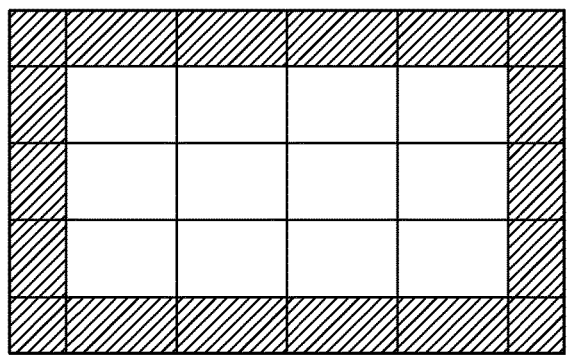
FIG. 3A is a view of region division of an image.

FIG. 1 is a diagram of a configuration of an image processing device 100 according to a first exemplary embodiment of the present invention. In FIG. 1, an image input circuit 101 is configured to input an image. The image input circuit 101 includes, for example, a circuit configured to receive an image as a motion image from a server or a camera device, or a camera unit configured to capture a motion image. A region division circuit 102 is configured to output division information for dividing the image input by the image input circuit 101 into multiple image regions. The shape of each image region is optional, but the image is divided in a grid pattern as illustrated in FIG. 3A in the present exemplary embodiment.

A feature point extraction circuit 103 is configured to extract a predetermined number of feature points from each image region based on the division information from the region division circuit 102. A feature point extracted from each frame by the feature point extraction circuit 103 will be hereinafter referred to as a "new feature point." A new feature point memory 104 is configured to hold information on the feature points extracted by the feature point extraction circuit 103. A tracking feature point memory 105 is configured to hold information on a feature point (hereinafter distinguished from the new feature point and referred to as a "tracking feature point") targeted for tracking. For an initial frame, the new feature point may be taken as the tracking feature point.

An image memory 106 is configured to temporarily store and hold a single frame or multiple frames of the image input by the image input circuit 101. A motion vector detection circuit (a vector calculation circuit) 107 is configured to detect, by template matching etc., a motion vector for the image input from the image input circuit 101 and the image memory 106 based on the tracking feature point information held in the tracking feature point memory 105. A reliability calculation circuit 108 is configured to calculate reliability for the motion vector input from the motion vector detection circuit 107.

A camera information acquisition circuit 109 is configured to acquire camera information used for estimation of an image capturing status. The camera information is an image capturing mode, main object information, a shutter speed, a focal length, depth information, inertial sensor information, user instruction information, etc. A notable target estimation circuit 110 is configured to estimate, based on the camera information acquired by the camera information acquisition circuit 109, which one of a background or an object should be focused during feature point tracking.

A priority level calculation circuit 111 is configured to use the motion vector detected by the motion vector detection circuit 107 and the reliability calculated by the reliability calculation circuit 108 to calculate the priority level of setting of the tracking feature point for each divided region based on an estimation result of the notable target estimation circuit 110. A feature point compensation circuit 112 is configured to determine the tracking feature point from an end point of the motion vector acquired by the motion vector detection circuit 107 based on the reliability acquired by the reliability calculation circuit 108 and the priority level acquired by the priority level calculation circuit 111. Alternatively, the feature point compensation circuit 112 is configured to determine the tracking feature point from the new feature point acquired by the new feature point memory 104. Then, the feature point compensation circuit 112 outputs the tracking feature point to the tracking feature point memory 105. In this exemplary embodiment, a feature point in a divided region with a higher priority level is preferentially set as the tracking feature point.

Figure 2:
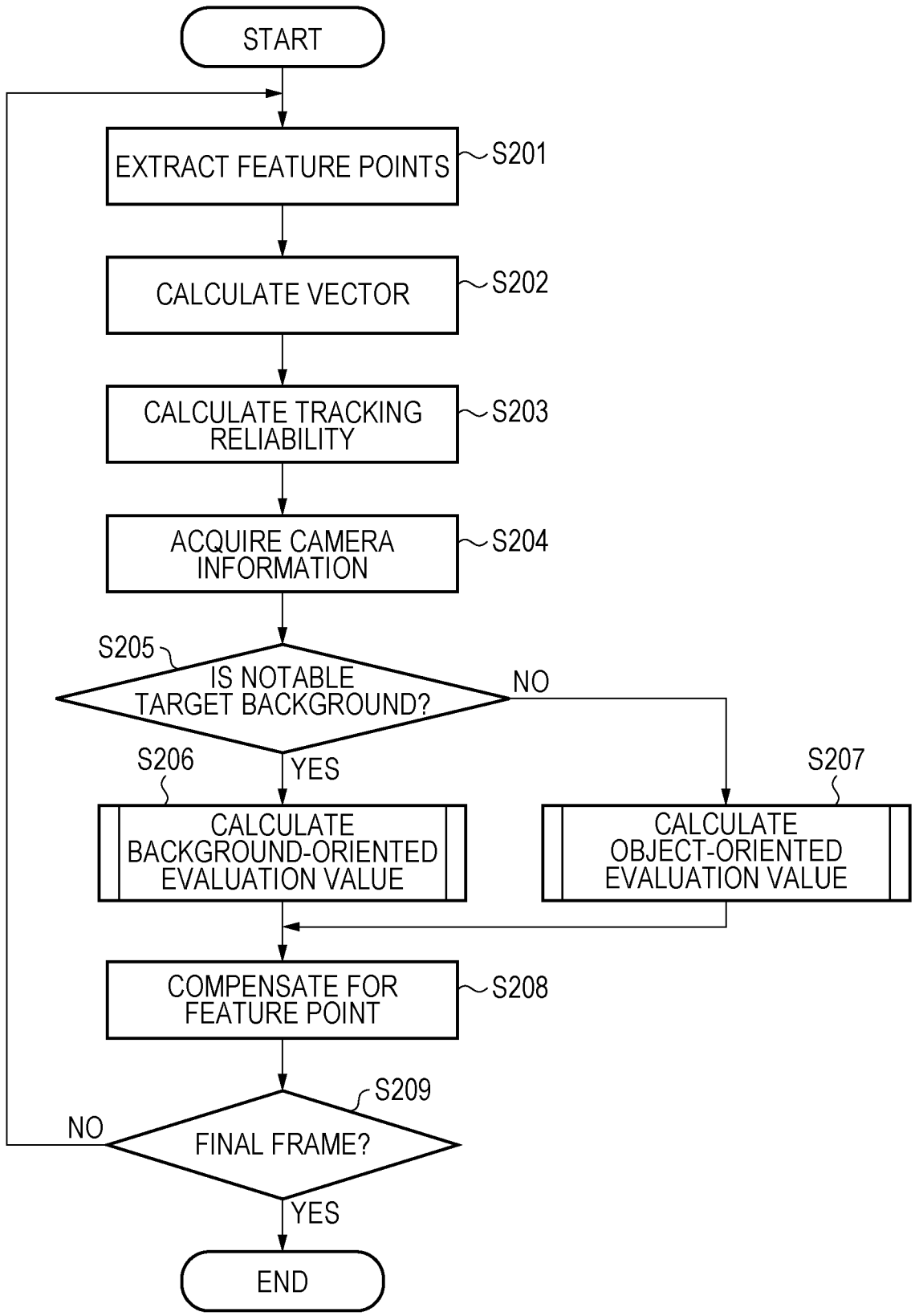
FIG. 2 is a flowchart for describing image processing performed in the first exemplary embodiment.

Next, operation of the image processing device 100 configured as described above will be described with reference to a flowchart shown in FIG. 2.

Figure 3B:
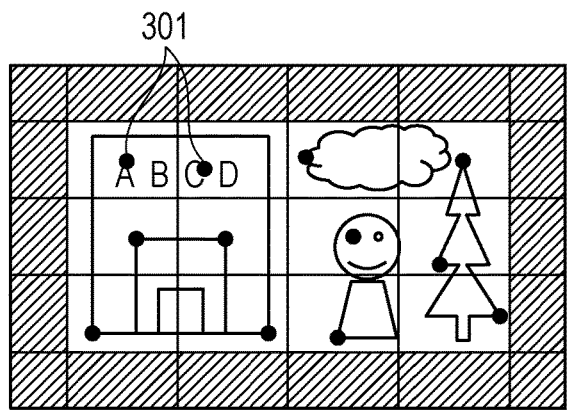
FIG. 3B is a view for describing extraction of a feature point for each region.

First, for the image input by the image input circuit 101, the feature point extraction circuit 103 extracts, at a step S201, the predetermined number of feature points from each of the multiple image regions divided by the region division circuit 102. In FIG. 3A, white rectangular regions are feature extraction regions for which feature point extraction is performed, and hatched peripheral regions are provided at the periphery of the feature extraction regions. These regions are extra image regions provided corresponding to protrusion of a template region and a search region used for later-described motion vector detection because the template region and the search region protrude beyond the feature extraction regions depending on the position of the extracted feature point. FIG. 3B illustrates a state when a single feature point 301 is extracted from each of the image regions divided in the grid pattern.

A well-known method may be used as a feature point extraction method. For example, the case of using a Harris corner detector or a Shi-Tomasi technique will be described. In these techniques, a luminance value at a pixel (x, y) of the image is represented by I(x, y), and an autocorrelation matrix H represented by Formula (1) is produced from results Ix, Iy obtained by application of horizontal and vertical first derivative filters to the image.

[Formula 1]

$$H = G * \begin{pmatrix} Ix^2 & IxIy \\ IxIy & Iy^2 \end{pmatrix} \quad (1)$$

In Formula (1), G represents smoothing by Gaussian distribution represented by Formula (2).

[Formula 2]

$$G(x, y) = \frac{1}{2\pi\sigma^2} \exp\left(-\frac{x^2 + y^2}{2\sigma^2}\right) \quad (2)$$

By a feature evaluation formula represented as Formula (3), the Harris corner detector extracts, as the feature point, a pixel with a great feature amount.

$$\text{Harris} = det(H) - \alpha(tr(H))^2 (\alpha = 0.04 \text{ to } 0.15) \quad (3)$$

In Formula (3), det represents a determinant, and tr represents the sum of diagonal components. Moreover, a is a constant, and is experimentally preferably a value of 0.04 to 0.15.

On the other hand, a feature evaluation formula represented as Formula (4) is used in the Shi-Tomasi technique.

$$\text{Shi and Tomashi} = \min(\lambda 1, \lambda 2) \quad (4)$$

Formula (4) shows that a smaller one of eigenvalues λ1, λ2 of the autocorrelation matrix H of Formula (1) is the feature amount. In the case of using the Shi-Tomasi technique, a pixel with a greater feature amount is also extracted as the feature point. For each of the divided image regions, the feature amount of the pixel is calculated using Formula (3) or Formula (4), and a predetermined number of pixels is, as the feature points, extracted in descending order according to the feature amount.

At a step S202, the motion vector is detected using the feature points extracted at the step S201. The motion vector detection circuit 107 detects the motion vector by template matching.

Figure 4A:
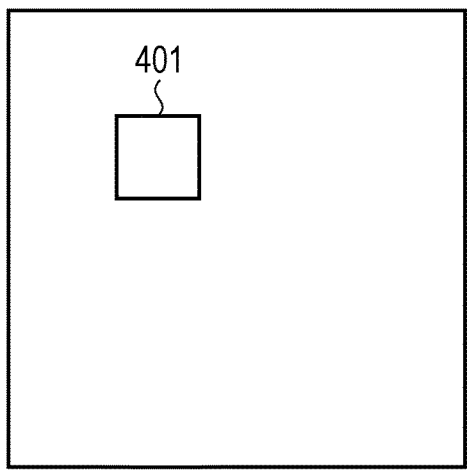
FIG. 4A is a view of a base image in template matching.
Figure 4B:
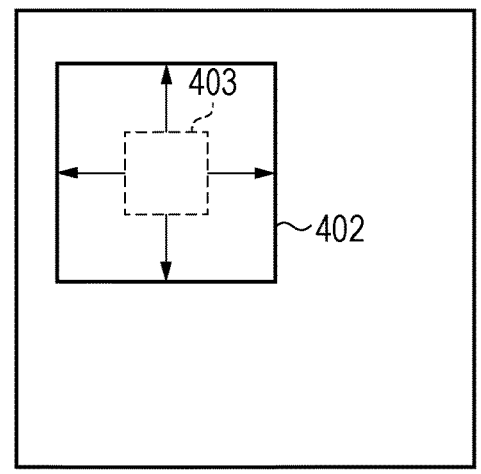
FIG. 4B is a view of a reference image in template matching.

FIGS. 4A and 4B are views of an outline of template matching. FIG. 4A illustrates a base image as one of two vector detection images, and FIG. 4B illustrates a reference image as the other vector detection image. In this exemplary embodiment, for calculating the motion vector from a previous frame image to a current frame image, a frame image held in the image memory 106 is used as the base image, and image data directly input from the image input circuit 101 is used as the reference image. Note that the base image and the reference image are interchangeable. This means that the motion vector from the current frame image to the previous frame image is calculated.

The motion vector detection circuit 107 places a template region 401 on the base image, and places a search region 402 on the reference image. The motion vector detection circuit 107 calculates a correlation evaluation value between the template region 401 and the search region 402. In this exemplary embodiment, the template region 401 may be placed about the feature point extracted at the step S201, and the search region 402 may be placed with such a predetermined size that the search region 402 includes the template region 401 equally on upper, lower, right, and left sides thereof.

In the present exemplary embodiment, the sum of absolute difference (hereinafter referred to as "SAD") is used as a correlation evaluation value calculation method. A SAD calculation formula is represented as Formula (5).

[Formula 5]

$$S\_SAD = \Sigma_i \Sigma_j |f(i,j) - g(i,j)| \quad (5)$$

In Formula (5), f(i, j) represents a luminance value at coordinates (i, j) in the template region 401. Moreover, g(i, j) represents a luminance value at coordinates in a region (hereinafter referred to as a "correlation evaluation value calculation region") 403 targeted for calculation of the correlation evaluation value in the search region 402. In the SAD, an absolute value of a difference between the luminance values f(i, j), g(i, j) in the search region 402 and the correlation evaluation value calculation region 403 is calculated, and the sum total of these absolute values is obtained to obtain a correlation evaluation value S_SAD. A smaller value of the correlation evaluation value S_SAD indicates a higher degree of similarity of texture between the template region 401 and the correlation evaluation value calculation region 403. Note that other methods than the SAD may be used for calculation of the correlation evaluation value. For example, the sum of squared difference (SSD) or normalized cross-correlation (NCC) may be used.

Figure 5B:
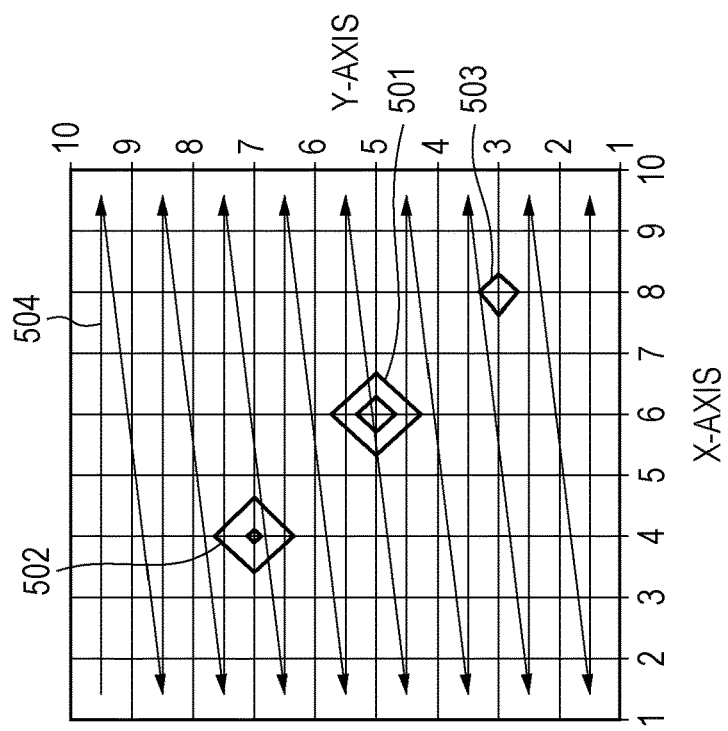
FIG. 5B is a graph for describing a contour of the correlation evaluation value map.

The motion vector detection circuit 107 moves the correlation evaluation value calculation region 403 across the entirety of the search region 402, thereby calculating the correlation evaluation value. In this manner, a correlation evaluation value map as illustrated in FIGS. 5A and 5B is produced for the search region 402.

Figure 5A:
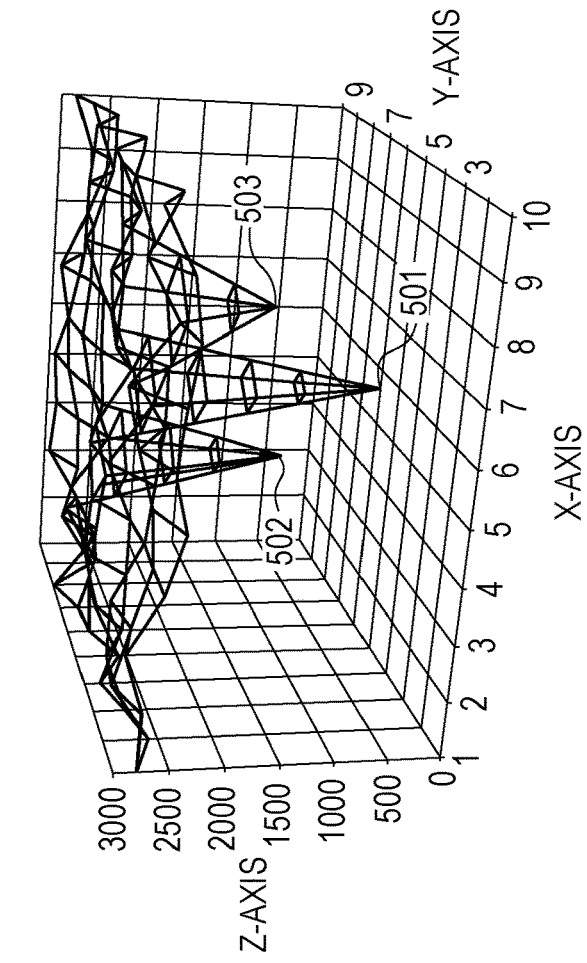
FIG. 5A is a correlation evaluation value map.

FIG. 5A illustrates the correlation evaluation value map calculated in a coordinate system of the search region 402, an X-axis and a Y-axis representing correlation evaluation value map coordinates and a Z-axis representing the magnitude of the correlation evaluation value at each coordinate. Moreover, FIG. 5B illustrates a contour of FIG. 5A. In FIGS. 5A and 5B, the correlation evaluation value is smallest at a minimal value 501 (a relative maximum degree of similarity), and it can be determined that there is texture extremely similar to that of the template region 401 in a region with the calculated minimal value 501 in the search region 402. A reference numeral "502" represents a second minimal value, and a reference numeral "503" represents a third minimal value. These values mean that there is next similar texture after the minimal value 501.

As described above, the motion vector detection circuit 107 calculates the correlation evaluation value between the template region 401 and the search region 402, thereby determining a position with the lowest correlation evaluation value in the correlation evaluation value calculation region 403. In this manner, a destination of the template region 401 of the base image on the reference image can be identified. Then, the motion vector can be detected, which takes, as a direction and a size, the direction and amount of movement to the destination on the reference image with reference to the position in the template region 401 of the base image.

At a step S203, the reliability calculation circuit 108 uses at least any of the feature point information acquired at the step S201 and the correlation evaluation value information acquired at the step S202, thereby calculating reliability (tracking reliability) in feature point tracking.

Figure 6:
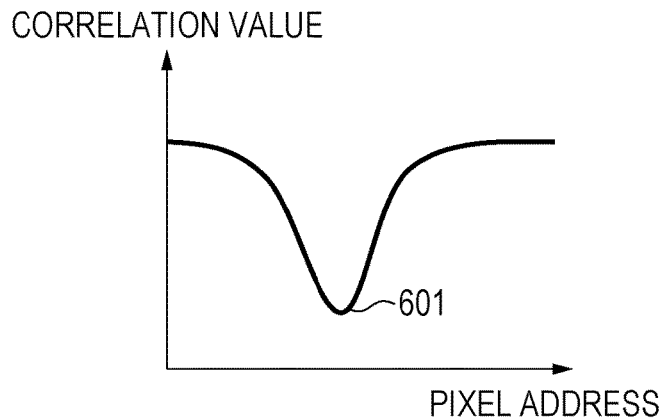
FIG. 6 is a graph for describing the method for expressing the correlation evaluation value map.

First, an example where the tracking reliability is calculated using the correlation evaluation value information will be described. The correlation evaluation values are arranged in a raster order as indicated by an arrow 504 in the two-dimensional correlation evaluation value map of FIG. 5B, and are unidimensionally illustrated in FIG. 6. The vertical axis of FIG. 6 is the correlation evaluation value, and the horizontal axis of FIG. 6 is a pixel address uniquely determined by the X-coordinate and the Y-coordinate of the correlation evaluation value map. Hereinafter, such expression of FIG. 6 will be used for calculation of the tracking reliability. Note that a position indicated by "601" in FIG. 6 is a position corresponding to the minimal value of FIGS. 5A and 5B.

Figure 7A:
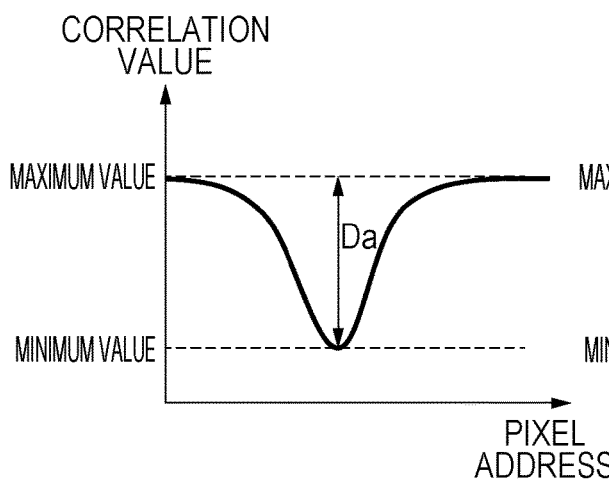
FIGS. 7A, 7B, 7C, and 7D are graphs for describing a correlation evaluation value indicator representing tracking reliability of the feature point.

FIGS. 7A to 7D are graphs of examples of a correlation evaluation value indicator of the tracking reliability. The horizontal axis of FIGS. 7A to 7D is the pixel address, and the vertical axis of FIGS. 7A to 7D is the correlation evaluation value. In FIG. 7A, a difference Da between the minimum value and the maximum value of the correlation evaluation value is used as the indicator. The difference Da represents the range of the correlation evaluation value map. In the case of a small difference Da, it is assumed that texture contrast is low, and therefore, the reliability is low.

Figure 7B:
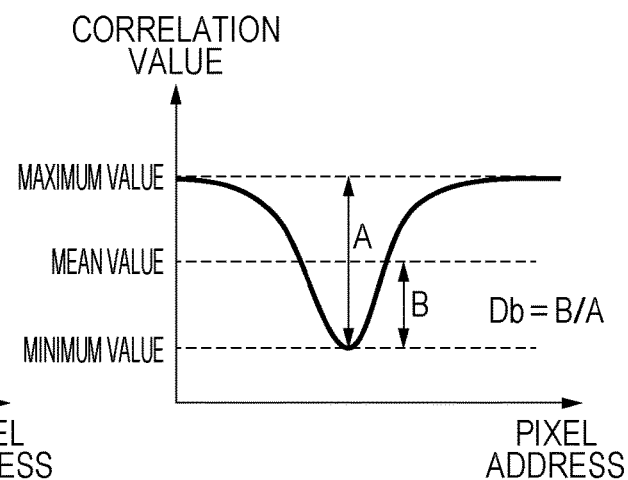

In FIG. 7B, a ratio Db (=B/A) between a difference A between the minimum value and the maximum value of the correlation evaluation value and a difference B between the minimum value and the mean value of the correlation evaluation value is used as the indicator. The ratio Db represents steepness of a correlation evaluation value peak. In the case of a small ratio Db, it is assumed that the degree of similarity between the template region and the search region is low, and therefore, the reliability is low.

Figure 7C:
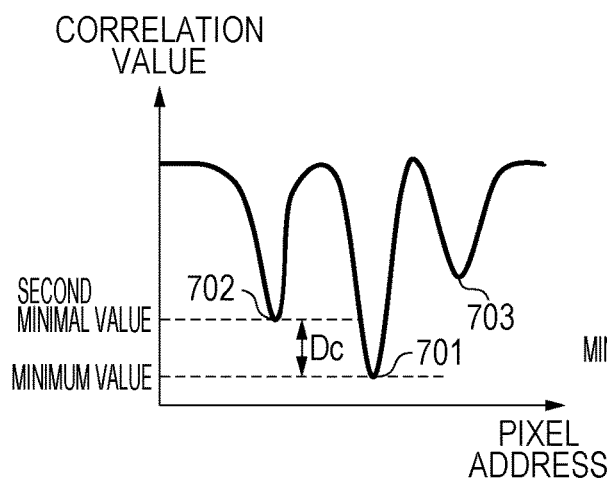

In FIG. 7C, a difference Dc between the minimal value and the second minimal value of the correlation evaluation value is used as the indicator. In this exemplary embodiment, reference numerals 701, 702, 703 each correspond to the correlation evaluation values 501, 502, 503 of FIGS. 5A and 5B. Thus, FIG. 7C means that it is verified whether or not there is a minimal value similar to the minimum correlation evaluation value on the contour of FIG. 5B. The difference Dc represents periodicity of the correlation evaluation value map. In the case of a small difference Dc, it is assumed that the texture is a repeated pattern, an edge, etc., and therefore, the reliability is low. Note that the minimal value and the second minimal value are selected in this exemplary embodiment, but other minimal values may be selected as long as the periodicity of the correlation evaluation value map can be determined.

Figure 7D:
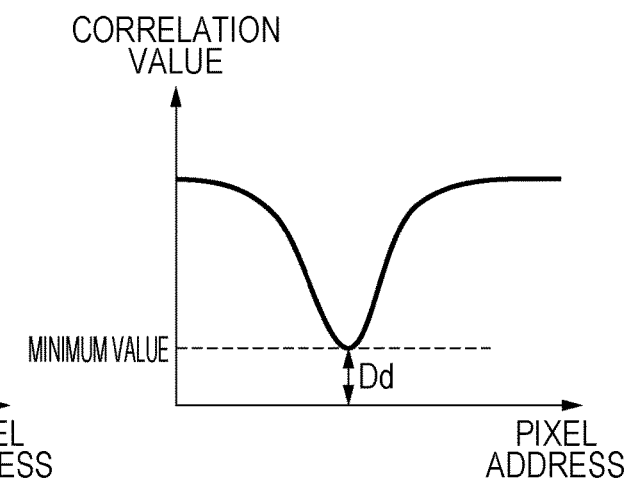

In FIG. 7D, the minimum value Dd of the correlation evaluation value is used as the indicator. In the case of a great minimum value Dd, it is assumed that the degree of similarity between the template region and the search region is low, and therefore, the reliability is low. The minimum value Dd and the reliability are in an inverse relation to each other, and therefore, an inverse number (1/Dd) of the minimum value Dd is taken as the indicator.

Figure 8A:
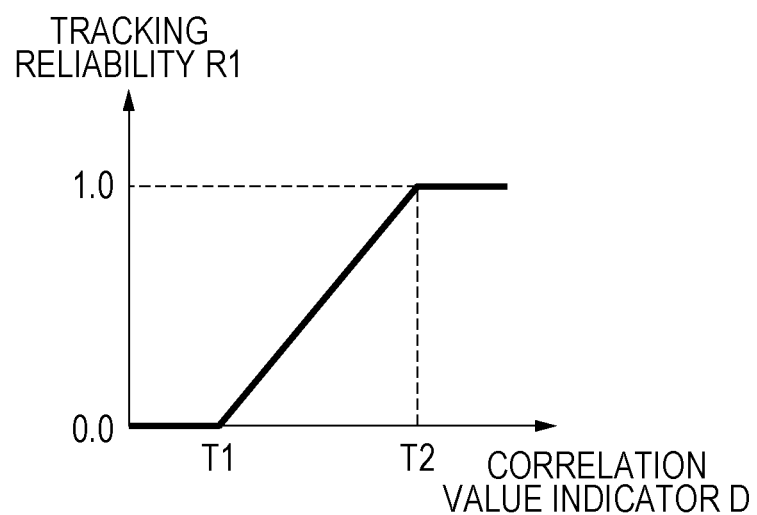
FIG. 8A is a graph for describing the method for calculating the tracking reliability of the feature point.

The above-described indicators of the correlation evaluation value can be directly used as the reliability, but the correlation evaluation value indicator and the reliability may be associated with each other as in FIG. 8A, for example. The horizontal axis of FIG. 8A is the correlation evaluation value indicator (any of Da, Db, Dc, and 1/Dd as described above), and the vertical axis of the FIG. 8A is the reliability. In this example, two thresholds T1, T2 are provided. The reliability is 0 at equal to or lower than the threshold T1, and is 1 at equal to or higher than the threshold T2. The thresholds may be changed according to the correlation evaluation value indicator. In a period between the threshold T1 and the threshold T2, the correlation evaluation value indicator and the reliability may be non-linearly associated with each other. In subsequent description, the reliability acquired from each correlation evaluation value indicator is represented as Ra, Rb, Rc, Rd. In this exemplary embodiment, relationships of Ra=f(Da), Rb=f(Db), Rc=f(Dc), and Rd=f(Dd) are satisfied.

The final reliability R1 may be calculated by combination of these reliabilities Ra, Rb, Rc, Rd. In this exemplary embodiment, a combination method based on weighted addition will be described. In combination by weighted addition, when the weights of the reliabilities Ra, Rb, Rc, Rd are each taken as Wa, Wb, Wc, Wd, the reliability R1 is calculated as in Formula (6).

$$R1 = Wa \times Ra + Wb \times Rb + Wc \times Rc + Wd \times Rd \tag{6}$$

Suppose that the weights are Wa=0.4, Wb=0.3, Wc=0.2, and Wd=0.1. In a case where all of the reliabilities are sufficiently high and Ra=Rb=Rc=Rd=1 is satisfied, R1=1.0 is obtained from Formula (6). In the case of Ra=0.6, Rb=0.5, Rc=0.7, and Rd=0.7, R1=0.6 is obtained from Formula (6).

Next, an example where the tracking reliability is calculated using the feature amount of the feature point will be described. In the case of accurately tracking the same feature point, a change in the feature amount of the feature point before and after tracking is small. Thus, the tracking reliability is calculated according to the amount of change in the feature amount before and after tracking.

Figure 8B:
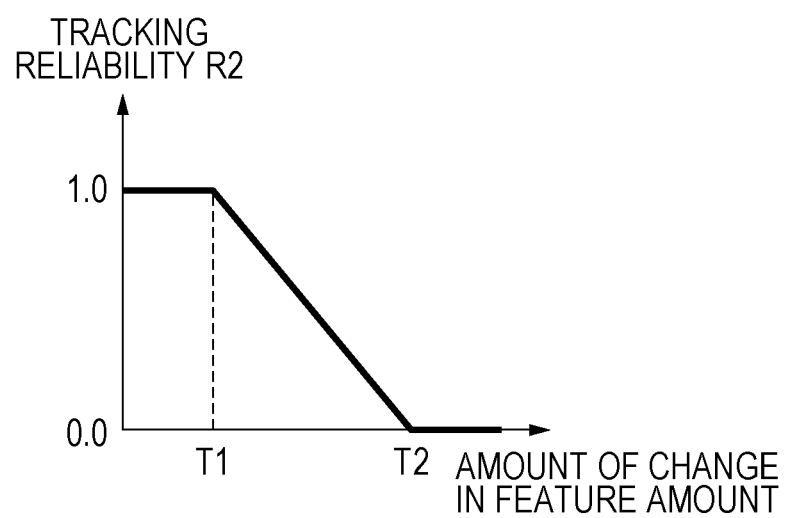
FIG. 8B is a graph for describing another method for calculating the tracking reliability of the feature point.

The amount of change in the feature amount is obtained in such a manner that the feature amounts are calculated using Formula (3) or (4) before and after tracking and a difference between these amounts is obtained. FIG. 8B illustrates an example of an association between the amount of change in the feature amount and the reliability. The horizontal axis of FIG. 8B is the amount of change in the feature amount, and the vertical axis of FIG. 8B is reliability R2. In this example, two thresholds T1, T2 are provided. In a case where the amount of change in the feature amount is a small value of equal to or less than the threshold T1, it is assumed that the same feature point can be accurately tracked as described above, and therefore, the reliability R2 is 1. Conversely, in a case where the amount of change in the feature amount is a great value of equal to or greater than the threshold T2, it is assumed that a different feature point is tracked by mistake, and therefore, the reliability R2 is 0. In a period between the thresholds T1, T2, the amount of change in the feature amount and the reliability may be non-linearly associated with each other.

As described above, the tracking reliabilities R1, R2 can be calculated from each of the correlation evaluation value information and the feature point information. Any one of the reliabilities R1, R2 or a combination of both reliabilities R1, R2 may be used as the final tracking reliability R. For the combination, weighted addition as described with reference to Formula (6) may be used.

Next, the camera information acquisition circuit 109 acquires, at a step S204, the camera information used for estimation of the image capturing status. The image capturing mode, the main object information, the shutter speed, the focal length, the depth information, the inertial sensor information, the user instruction information, etc. are used as examples of the camera information acquired at the step S204.

The main object information includes, for example, humanity of a main object, the size of the main object, and motion of the main object. For example, in a case where the main object is a person face, the humanity and size of the main object can be acquired by a well-known face detection technique using information on the color or outline of the main object. Motion of the main object can be acquired from the motion vector detected among the image frames by the above-described motion vector detection technique. Moreover, the depth information can be detected by means of a ranging sensor, or can be detected from the captured image by a well-known stereo matching method.

At a step S205, the notable target estimation circuit 110 estimates the image capturing status based on the camera information acquired at the step S204, and estimates which one of the background or the object should be focused during feature point tracking. In a case where a notable target upon image capturing is the background, it is preferable that the tracking feature points are uniformly distributed across a screen. This is because when the feature points are locally distributed, motion information on the background in a region with no feature points cannot be acquired. On the other hand, in a case where the notable target upon image capturing is the object, it is preferable that the tracking feature points are concentrated in the vicinity of the object. This is because when the feature points are uniformly distributed, motion information on the object cannot be sufficiently acquired. Thus, it is preferable that it is, from the camera information, estimated which one of the background or the object is the notable target and distribution of the tracking feature points is controlled according to such an estimation result.

Next, the method for estimating the notable target based on the camera information will be described. In this exemplary embodiment, a background level indicating such a level that the notable target is the background and an object level indicating such a level that the notable target is the object are first calculated for each piece of the camera information. In this exemplary embodiment, the background level and the object level are represented as numerical values whose sum is 1. Note that only either one of the object level and the background level may be calculated.

For the image capturing mode, in the case of, e.g., a portrait mode, there is a high probability that a person (=the object) is focused during image capturing. Thus, the object level is set higher (e.g., 0.9), and the background level is set lower (e.g., 0.1). On the other hand, in the case of a landscape mode, there is a high probability that a landscape is focused during image capturing. Thus, the object level is set lower (e.g., 0.1), and the background level is set higher (e.g., 0.9). As described above, in the image capturing mode, a probable image capturing status is assumed according to the mode, and therefore, the object level and the background level can be determined. For the humanity of the main object, a higher humanity of the main object results in a higher probability that the object is focused during image capturing. Thus, the object level is set higher (e.g., 0.7), and the background level is set lower (e.g., 0.3).

For the size of the main object, a larger size of the main object results in a higher probability that the object is focused during image capturing. Thus, the object level is set higher (e.g., 0.8), and the background level is set lower (e.g., 0.2). For motion of the main object, it is assumed that smaller motion of the main object results in a higher probability that the object is focused during image capturing. Thus, the object level is set higher (e.g., 0.6), and the background level is set lower (e.g., 0.4). For the shutter speed, a higher shutter speed results in a higher probability that the object moving at high speed is focused during image capturing. Thus, the object level is set higher (e.g., 0.7), and the background level is set lower (e.g., 0.3). A relationship between the camera information and the notable object as described above is summarized in FIG. 9. Numerical values in parentheses are described as an example of the background/object level as described above.

Next, it is difficult to understand a photographer's intention from the focal length or the depth information alone. For this reason, an example of the method for estimating the notable target by combination of both of the focal length and the depth information will be described.

In a case where a focal length f [mm] and a distance (the depth information) d [mm] to the main object are provided, when the size of the main object on an imaging plane is X [mm], an actual size Y [mm] of the main object can be calculated using Formula (7) below.

$$Y=(d/f)X$$

With the actual size of the main object, the photographer's intention can be understood from a relationship with the size of the main object on the imaging plane or the focal length. For example, in a case where the actual size of the main object is small, but the size of the main object on the imaging plane is large and the focal length is long, the main object is greatly focused. Thus, the object level increases and the background level decreases as the actual size of the main object decreases, the size of the main object on the imaging plane increases, and the focal length increases.

It is also difficult to understand the photographer's intention from the inertial sensor information alone. For this reason, an example of the method for estimating the notable target by combination of the inertial sensor information and the motion information on the object will be described. In a case where the photographer's notable target is the object, the camera is moved such that the object is at a fixed position on the screen, and therefore, motion of the object is relatively smaller than that of the camera. Thus, it is assumed that the camera is more held still to capture the object as the movement amount of the object decreases as compared to the movement amount of the camera between the frame images, the movement amount of the camera being acquired by the inertial sensor information. There is a high probability that the object is focused during image capturing. Thus, the object level is set higher, and the background level is set lower.

In a case where there are multiple pieces of the camera information which can be utilized for estimation of the notable target, weighted addition (weight summing) may be performed for the background level and the object level acquired for each piece of the camera information, and in this manner, the final background level and the final object level may be calculated. The weight may be set based on the degree of certainty of each information source, for example. In a case where the degree of certainty of each information source is identical or unknown, all of the weights may be set as 1.

Eventually, the notable target is estimated based on the final background level and the final object level. For example, in a case where the final background level exceeds the final object level, the background is estimated as the notable target, and the processing transitions to a step S206. Conversely, in a case where the final background level falls below the object level, the object is estimated as the notable target, and the processing transitions to a step S207. Note that in the case of using the user instruction information as the camera information, a user instructs which one of the background or the object is focused so that the notable target can be determined without estimation, for example.

At the step S206, the notable target is the background, and therefore, the priority level calculation circuit 111 calculates the priority level of setting of the tracking feature point for each divided region such that the tracking feature points are uniformly distributed across the screen as described above. A detailed flowchart of the step S206 is shown in FIG. 10.

Figure 10:
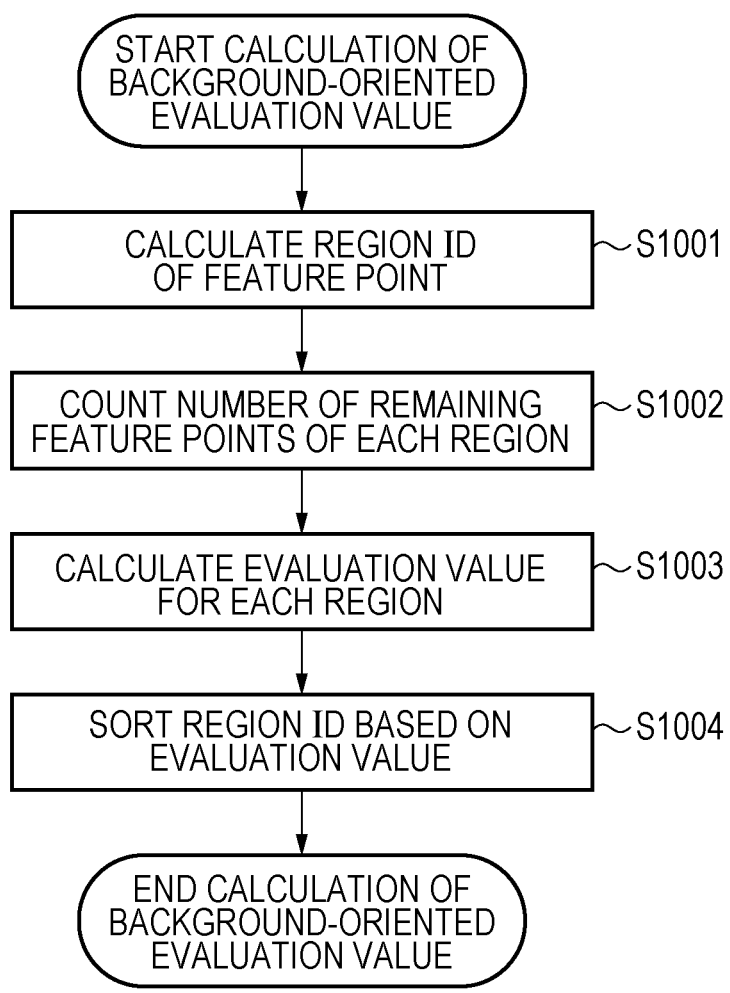
FIG. 10 is a flowchart for describing evaluation value calculation processing in a case where the notable target is a background.
Figure 11:
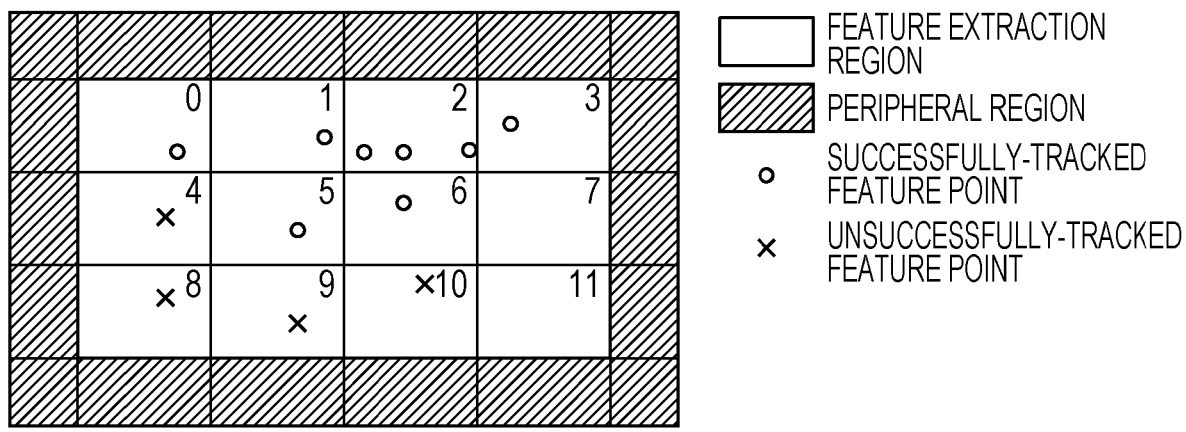
FIG. 11 is a view for describing calculation of region IDs for the feature points.

In FIG. 10, the priority level calculation circuit 111 calculates, at a step S1001, the ID of the divided region to which the tracked feature point belongs. FIG. 11 illustrates an example of the region ID of the feature point. A number on the upper right side in each feature extraction region indicates the region ID. In the example of FIG. 11, region IDs of 0 to 11 are unidimensionally provided. Note that the region ID may be expressed horizontally and vertically, i.e., two-dimensionally. Moreover, the feature point determined as having the tracking reliability equal to or higher than the predetermined threshold at the step S203 is indicated by a circle mark as a successfully-tracked feature point, and the feature point determined as having the tracking reliability lower than the predetermined threshold is indicated by a cross mark as a unsuccessfully-tracked feature point. Of 12 feature points in the example of FIG. 11, eight feature points are the successfully-tracked feature points, and four feature points are the unsuccessfully-tracked feature points.

In this exemplary embodiment, the region ID is calculated for at least each of the successfully-tracked feature points. For example, in a region ID calculation method, coordinate values of four corners of each feature extraction region are acquired as the division information from the region division circuit 102, and are compared with the feature point coordinates to calculate the feature extraction region to which the feature point coordinates belong.

Figure 12:
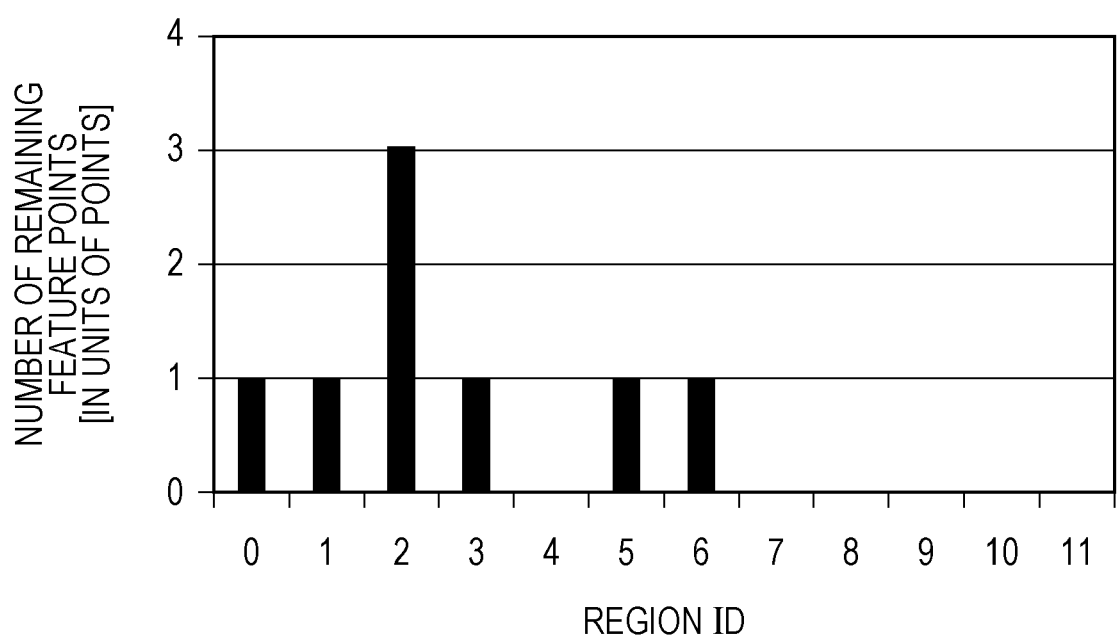
FIG. 12 is a graph of the number of successfully-tracked feature points for each region ID.

At a step S1002, the priority level calculation circuit 111 counts the number of successfully-tracked feature points in each region based on the region ID of each feature point calculated at the step S1001. In this exemplary embodiment, the number of unsuccessfully-tracked feature points is not counted. A counting result of the number of successfully-tracked feature points in the case of FIG. 11 is shown in FIG. 12. A single successfully-tracked feature point is present in each of the regions with the region IDs of 0, 1, 3, 5, 6, and three successfully-tracked feature points are present in the region with the region ID of 2.

At a step S1003, the priority level calculation circuit 111 uses the number of feature points acquired for each region at the step S1002, thereby calculating the priority level of newly setting of the tracking feature point for each region. In this exemplary embodiment, it is intended to set such that the tracking feature points are uniformly distributed across the screen, and therefore, a higher priority level of newly setting of the tracking feature point is given to a region with less successfully-tracked feature points. Even in a case where a small number of successfully-tracked feature points are present in a region, when many successfully-tracked feature points are present in regions around such a region, a low priority level is given to such a region. Based on the above-described idea, the method for calculating the priority level will be described with reference to FIGS. 13A to 13C.

In FIG. 13A, the priority level is calculated for the region with the region ID of 5. In addition to the region with the region ID of 5 as a notable region, the regions with the region IDs of 0, 1, 2, 4, 6, 8, 9, 10 around the notable region are also taken into consideration. For calculation of a priority level P, a value obtained by weighted addition of the number of successfully-tracked feature points in the notable region and the regions around the notable region is employed as an evaluation value S, for example. An example of weighting in weighted addition is illustrated in FIG. 13C. Based on such an idea that a greater weight is on a region closer to the notable region, the weight on the notable region is 4, the weight on the regions on the upper, lower, right, and left sides of the notable region is 2, and the weight on the regions positioned obliquely from the notable region is 1.

In FIG. 13A, when the evaluation value for the region with the region ID of 5 is calculated by means of weighting of FIG. 13C, S=E (the weight of each region×the number of successfully-tracked feature points in each region)=1×1+2×1+1×3+2×0+4×1+2×1+1×0+2×0+1×0=12 is satisfied. In this exemplary embodiment, a region with a greater evaluation value S means a greater number of successfully-tracked feature points in the notable region and the regions around the notable region, and the priority level of newly setting of the tracking feature point for the notable region is low. Thus, a smaller evaluation value S results in a higher priority level.

In FIG. 13B, the evaluation value S is calculated for the region with the region ID of 8. As in the case of FIG. 13A, the regions around the region with the region ID of 8 as the notable region are taken into consideration in addition to such a notable region, but this case is different from the case of FIG. 13A in that other regions than the regions with the region IDs of 4, 5, 9 are the above-described peripheral regions. The peripheral regions are outside the feature extraction regions. Thus, no new feature point is present in the peripheral regions, and the feature points present in the peripheral regions are only feature points moved due to tracking. For this reason, the existence probability of the feature point is lower in the peripheral region than in the feature extraction region. When the number of feature points in the peripheral region is directly used, a low evaluation value is calculated for the outermost feature extraction regions (other feature extraction regions than the regions with the region IDs of 5, 6 in FIG. 11), leading to the biased priority level. For preventing such a situation, the number of feature points in the peripheral region is preferably taken as a non-zero value, and in this exemplary embodiment, is constantly 1. In a case where the number of feature points in the peripheral region is 1, the evaluation value S is, for the initial frame, the same among all of the feature extraction regions (in this example, S=1×1+2×1+1×1+2×1+4×1+2×1+1×1+2×1+1×1=16 is satisfied, and this is equal to the sum total value of the weights), and no bias is caused.

At a step S1004, the priority level calculation circuit 111 sorts the region IDs in descending order of the priority level (in this example, in ascending order of the evaluation value) based on the evaluation values obtained at the step S1003.

An evaluation value calculation result for the example of FIG. 11 is shown in FIG. 14A. FIG. 14A shows the result before sorting, and at this point, the evaluation values are arranged in order of the region IDs. The evaluation values sorted in ascending order are shown in FIG. 14B. Note that in a case where the same evaluation value is obtained for multiple region IDs, these evaluation values may be arranged in ascending order of the region IDs, for example. When the step S1004 is completed, the processing transitions to a step S208.

On the other hand, at the step S207, the notable target is the object, and therefore, the priority level calculation circuit 111 calculates the priority level of setting of the tracking feature point for each divided region such that the tracking feature points are concentrated in the vicinity of the object as described above. A detailed flowchart of the step S207 is shown in FIG. 15.

Figure 15:
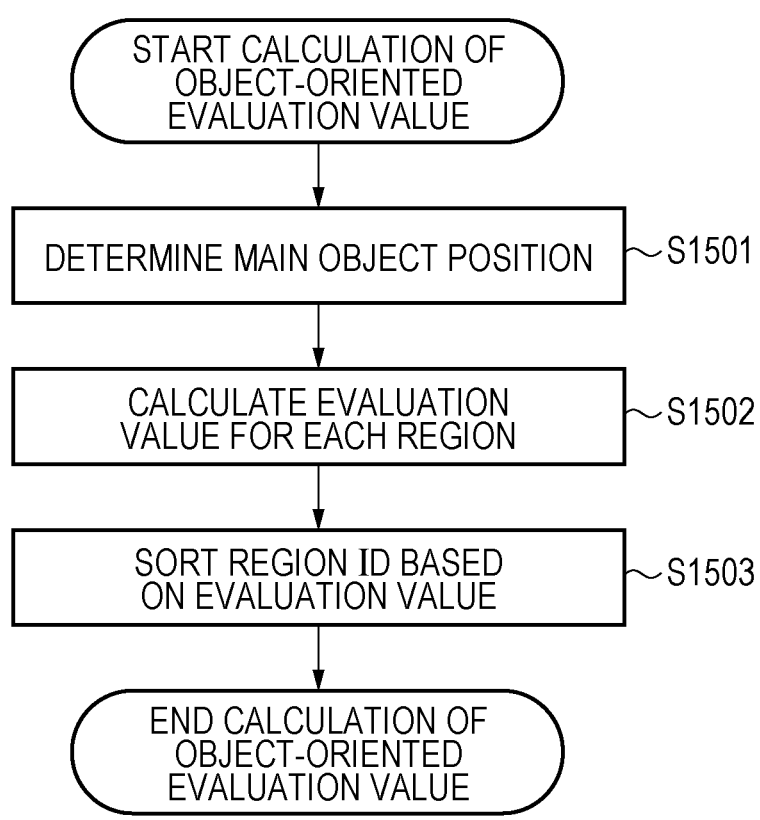
FIG. 15 is a flowchart for describing evaluation value calculation processing in a case where the notable target is an object.

In FIG. 15, the priority level calculation circuit 111 uses, at a step S1501, the main object information acquired by the camera information acquisition circuit 109 at the step S204, thereby determining, as a main object position, coordinates indicating a main object region. For example, the coordinates of the center of gravity of a face region are determined as the main object position.

At a step S1502, the priority level calculation circuit 111 uses the main object position acquired at the step S1501, thereby calculating the priority level of newly setting of the tracking feature point for each region. In this exemplary embodiment, it is intended to set such that the tracking feature points are concentrated in the vicinity of the object, and therefore, a higher priority level of newly setting of the tracking feature point is given to a region closer to the object. Based on the above-described idea, the method for calculating the priority level will be described with reference to FIG. 16.

Figures 16, 17A, 17B:
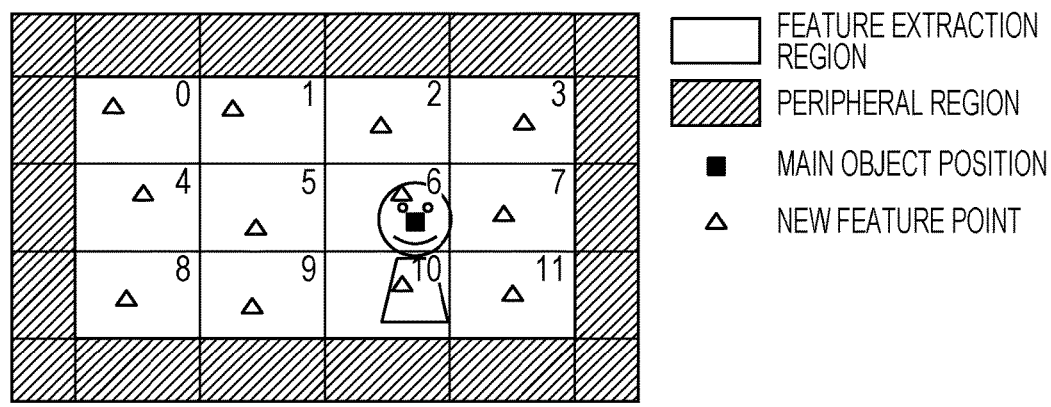
FIG. 16 is a view for describing the method for calculating evaluation values in a case where the notable target is the object.
FIG. 17A is a table for describing the evaluation values before sorting in a case where the notable target is the object.
FIG. 17B is a table for describing the evaluation values after sorting.

In FIG. 16, the face is present in the region with the region ID of 6, and the coordinates of the center of gravity of such a face region are taken as the main object position (a representative main object position). A higher priority level is given to a divided region closer to such a main object position. In this exemplary embodiment, a distance between a main object position indicated by a black rectangle and a representative point of each divided region indicated by a white triangle is employed as the evaluation value S for calculation of the priority level P, for example. In FIG. 16, a new feature point is illustrated as the representative point of each divided region, but the coordinates of the center of gravity of each divided region may be used. In a case where multiple new feature points are extracted from each divided region, any one of the new feature points (e.g., the new feature point with the maximum feature amount) may be taken as the representative point of each divided region.

In this exemplary embodiment, a region with a greater evaluation value S means a greater distance from the main object position, and the priority level of newly setting of the tracking feature point for this notable region is low. Thus, a smaller evaluation value S results in a higher priority level.

At a step S1503, the priority level calculation circuit 111 sorts the region IDs in descending order of the priority level (in this example, in ascending order of the evaluation value) based on the evaluation values obtained at the step S1502. An evaluation value calculation result for the example of FIG. 16 is shown in FIG. 17A. FIG. 17A shows the result before sorting, and at this point, the evaluation values are arranged in order of the region IDs. The evaluation values sorted in ascending order are shown in FIG. 17B. When the step S1503 is completed, the processing transitions to the step S208.

At the step S208, the feature point compensation circuit 112 sets the tracking feature points based on the reliability acquired at the step S203 and the priority level of setting of the tracking feature point acquired for each divided region at the step S206 or S207.

Referring back to FIG. 11, the details of the step S208 will be described. In FIG. 11, there are four unsuccessfully-tracked feature points determined as having the tracking reliability falling below the predetermined threshold at the step S203. The feature point compensation circuit 112 excludes these four unsuccessfully-tracked feature points from the tracking feature points, and newly sets four new feature points as tracking targets. At this point, the four tracking feature points are newly determined based on the priority level of setting of the tracking feature point calculated for each divided region at the step S206 or S207.

Figure 18:
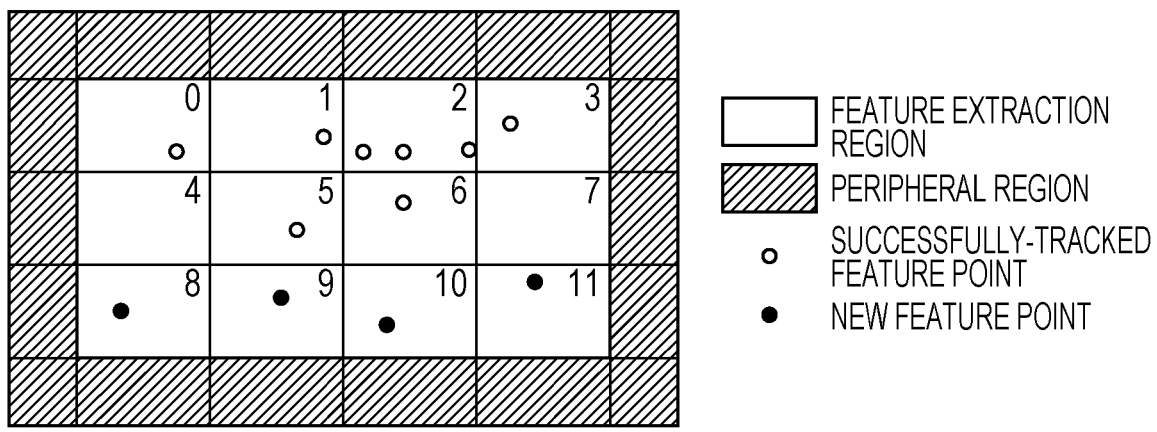
FIG. 18 is a view for describing a feature point compensation result in a case where the notable target is the background.

First, the case of transitioning from the step S206 to the step S208 will be described. At the step S206, the notable target is the background, the priority level of setting of the tracking feature point for each divided region is calculated such that the tracking feature points are uniformly distributed across the screen, and the result of FIG. 14B is obtained. The feature point compensation circuit 112 selects the four region IDs of 9, 10, 8, 11 with the lowest evaluation values in FIG. 14B. Then, as illustrated in FIG. 18, four new feature points indicated by black circles and each extracted from the four regions with the selected region IDs are set as the tracking targets, and therefore, the tracking feature points are substantially uniformly set across the screen.

Figure 19:
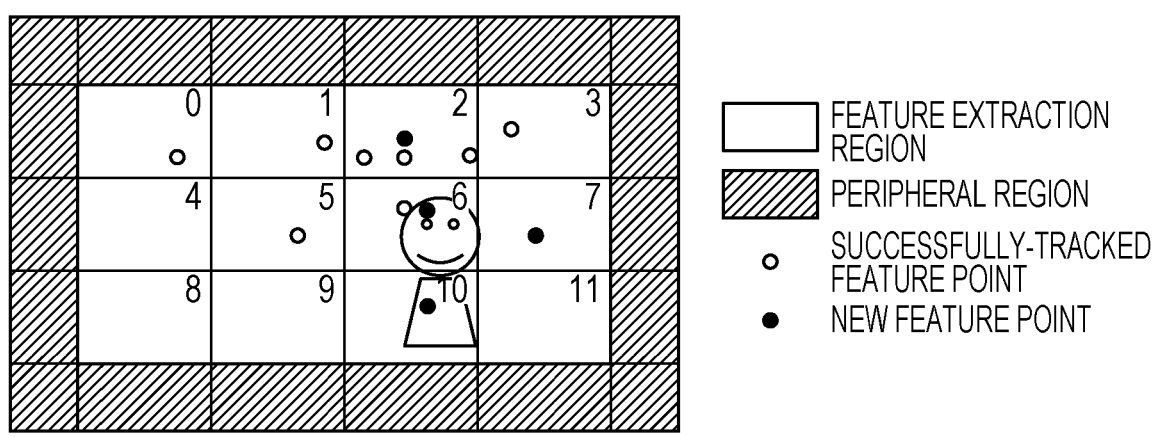
FIG. 19 is a view for describing a feature point compensation result in a case where the notable target is the object.

Next, the case of transitioning from the step S207 to the step S208 will be described. At the step S207, the notable target is the object, the priority level of setting of the tracking feature point for each divided region is calculated such that the tracking feature points are concentrated in the vicinity of the object, and the result of FIG. 17B is obtained. The feature point compensation circuit 112 selects the four region IDs of 6, 10, 7, 2 with the lowest evaluation values in FIG. 17B. Then, as illustrated in FIG. 19, four new feature points indicated by black circles and each extracted from the four regions with the selected region IDs are set as the tracking targets, and therefore, the tracking feature points are set substantially concentrated in the vicinity of the object.

At a final step S209, the image processing device 100 determines whether or not the processing for a final frame has been completed. In a case where the processing for the final frame has not been completed yet, the processing returns to the step S201, and operation of the steps S201 to S209 is repeated until the final frame.

As described above, in the present exemplary embodiment, the image capturing status is estimated using the camera information, and it is estimated which one of the background or the object should be focused during feature point tracking. Thereafter, the tracking feature points can be set such that feature point distribution suitable for the estimation result is brought.

Second Exemplary Embodiment

An image processing device according to a second exemplary embodiment of the present invention will be described. A block configuration of the device is the same as that of the first exemplary embodiment illustrated in FIG. 1, and therefore, description thereof will not be repeated. The present exemplary embodiment is different from the first exemplary embodiment in that the tracking success rate of each divided region is taken into consideration in a priority level calculation circuit 111.

In the first exemplary embodiment, it is estimated which one of the background or the object should be focused during feature point tracking, and the tracking feature points are set such that the feature point distribution suitable for the estimation result is brought. However, in some cases, no texture is present in some of the image regions depending on a scene, and the tracking success rate is low. For this reason, when the tracking feature points are set without consideration of the tracking success rate, the set feature points promptly become untrackable, and therefore, the continuously-trackable feature points cannot be sufficiently acquired. Thus, the present exemplary embodiment is intended to set tracking feature points considering the tracking success rate of each divided region, thereby increasing the number of continuously-trackable feature points.

Figure 20:
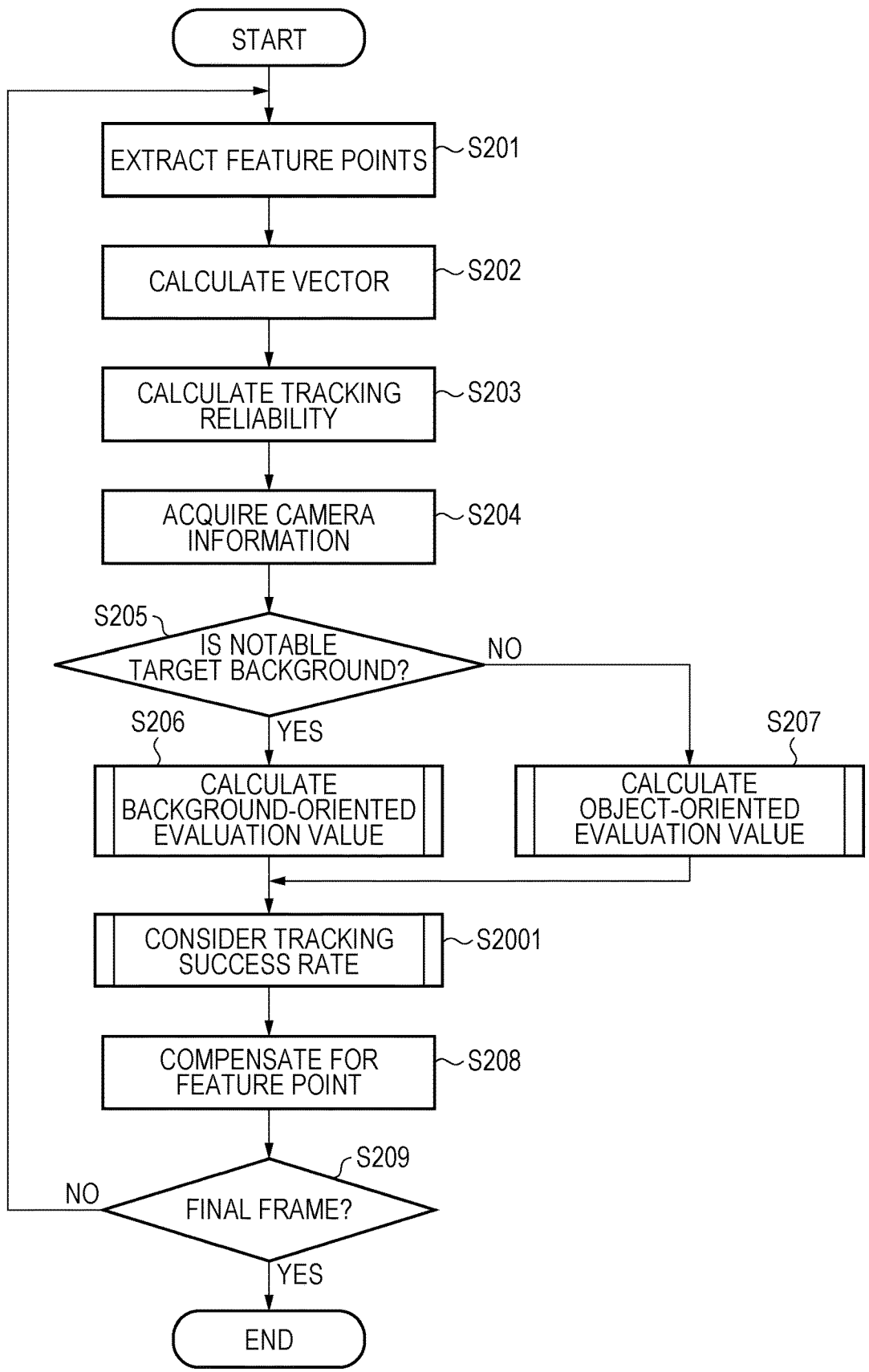
FIG. 20 is a flowchart for describing image processing performed in a second exemplary embodiment.

The second exemplary embodiment will be described with reference to a flowchart shown in FIG. 20. In FIG. 20, the same reference numerals as those of the steps shown in FIG. 2 are used to represent equivalent steps, and description thereof will not be repeated. In the present exemplary embodiment, the processing transitions to a step S2001 after completion of the processing of a step S206 or S207.

Figure 21:
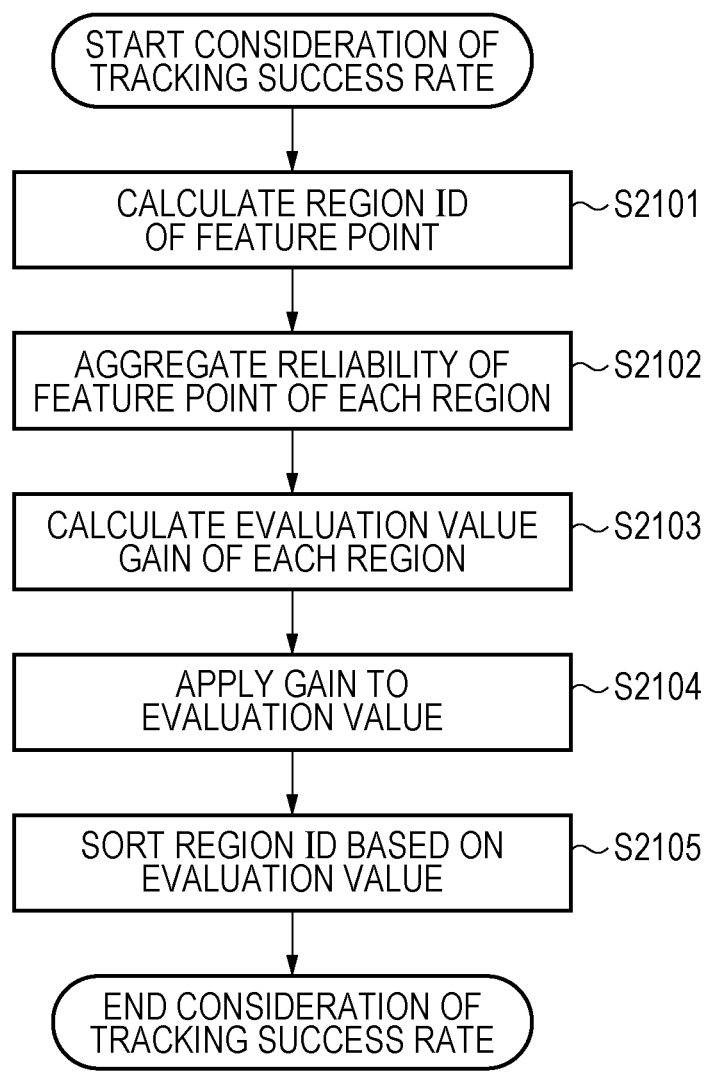
FIG. 21 is a flowchart for describing evaluation value calculation processing of the second exemplary embodiment.

At the step S2001, the priority level calculation circuit 111 calculates the priority level of setting of the tracking feature point, considering the tracking success rate of each divided region. A detailed flowchart of the step S2001 is shown in FIG. 21.

At a step S2101, the priority level calculation circuit 111 calculates the region ID of the divided region to which the tracked feature point belongs. This processing is the same as that of a step S1001, and therefore, description thereof will not be repeated. In the case of performing the processing of the step S1001 before the step S2001, a result at the step S1001 is held so that this step can be skipped.

Figures 22A, 22B:
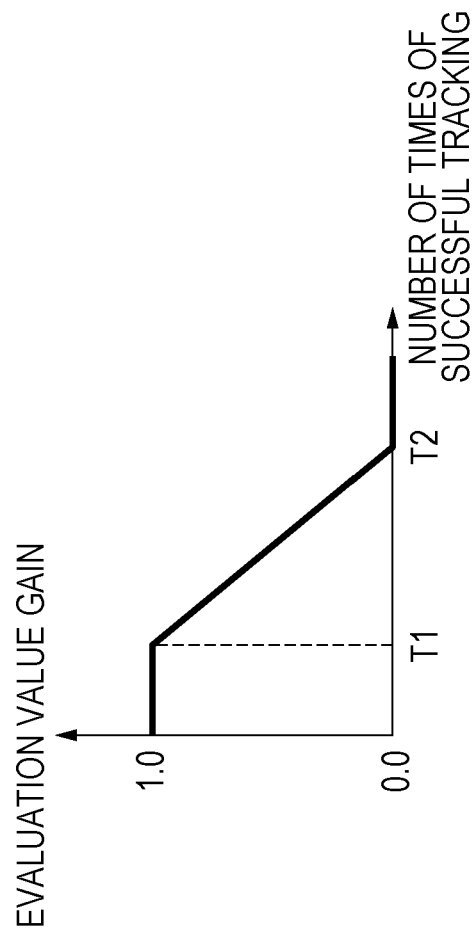
FIG. 22A is a table of an evaluation value calculation result of the second exemplary embodiment.
FIG. 22B is a graph for describing the method for obtaining an evaluation value for the number of times of tracking.

At a step S2102, the priority level calculation circuit 111 counts the number of times of successful tracking of the feature point belonging to each region based on the region IDs acquired at the step S2101. FIG. 22A shows an example of a result obtained by execution of the step S2102 for the example of FIG. 11. For the regions with region IDs of 4, 7, 8, 9, 10, 11 with no successfully-tracked feature points, the number of times of successful tracking is taken as 0.

At a step S2103, the priority level calculation circuit 111 calculates a gain for an evaluation value obtained at the step S206 or S207 based on the number of times of successful tracking of the feature point for each divided region as obtained at the step S2102. In this exemplary embodiment, for improvement of the number of continuously-trackable feature points, the evaluation value gain is determined such that a higher priority level of setting of the tracking feature point (in this example, a smaller evaluation value) is given to a region with a greater number of times of successful tracking of the feature point. An example of an evaluation value gain calculation method is shown in FIGS. 22A and 22B. The horizontal axis of FIG. 22B is the number of times of successful tracking of the feature point, and the vertical axis of FIG. 22B is the evaluation value gain. In this example, two thresholds T1, T2 are provided. The evaluation value gain is 1 in a case where the number of times of successful tracking of the feature point is a small value of equal to or less than the threshold T1, and is 0 in a case where the number of times of successful tracking of the feature point is a great value of equal to or greater than the threshold T2. In a period between the thresholds T1, T2, the number of times of successful tracking of the feature point and the evaluation value gain may be non-linearly associated with each other. An example of the evaluation value gain calculated as described above is shown in FIG. 22A. Note that in a case where multiple feature points are present in the same region, the evaluation value gain may be calculated using, as the number of times of successful tracking of the feature point in such a region, the mean value of the number of times of successful tracking of each feature point, for example.

At a step S2104, the priority level calculation circuit 111 multiplies the evaluation value obtained at the step S206 or S207 by the evaluation value gain obtained at the step S2103. A result obtained by multiplication of the evaluation value of FIGS. 14A and 14B by the evaluation value gain of FIG. 22A is shown in FIG. 23A.

Eventually, at a step S2105, the priority level calculation circuit 111 sorts the region IDs in descending order of the priority level (in this example, in ascending order of the evaluation value) based on the evaluation values obtained at the step S2104.

Figures 23A, 23B, 24:
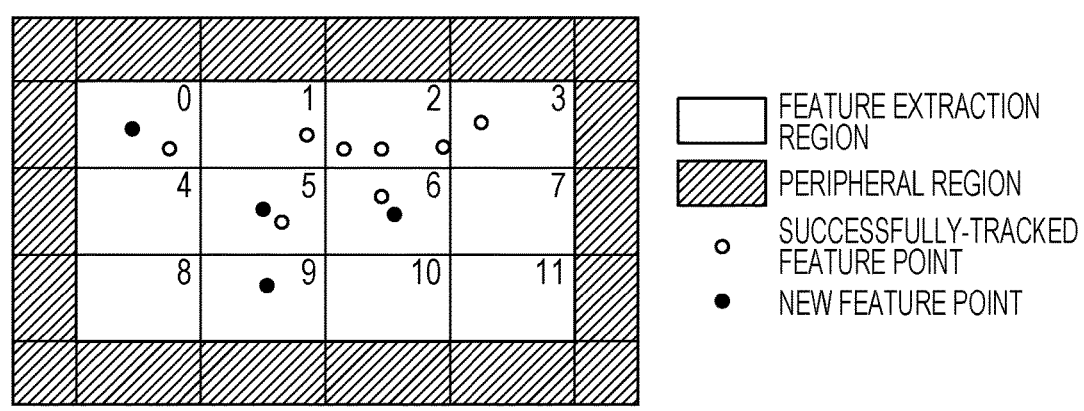
FIG. 23A is a table for describing evaluation values before sorting in the second exemplary embodiment.
FIG. 23B is a table for describing the evaluation values after sorting.
FIG. 24 is a view for describing a feature point compensation result of the second exemplary embodiment.

The evaluation values of FIG. 23A sorted in ascending order are shown in FIG. 23B. Note that in a case where the same evaluation value is obtained for multiple region IDs, the evaluation values may be arranged in ascending order of the region ID, for example. When the step S2105 is completed, the processing transitions to a step S208.

At the step S208, a feature point compensation circuit 112 selects four region IDs of 6, 5, 0, 9 with the lowest evaluation values in FIG. 23B as obtained at the step S2105. Then, as illustrated in FIG. 24, four new feature points indicated by black circles and each extracted from the four regions with the selected region IDs are set as tracking targets. A result of FIG. 24 is different from the results of FIGS. 18 and 19 of the first exemplary embodiment. This is because the tracking success rate of each divided region is taken into consideration.

As described above, in the present exemplary embodiment, the tracking feature points are set considering the tracking success rate of each divided region. Thus, the advantageous effect of improving the number of continuously-trackable feature points is provided in addition to the advantageous effect of the first exemplary embodiment, i.e., the advantageous effect of tracking the feature points in the distribution suitable for the image capturing status.

Other Exemplary Embodiments

Moreover, embodiment(s) of the present invention can be implemented by the processing of supplying a program for implementing one or more functions of the above-described exemplary embodiments to a system or a device via a network or a storage medium and reading and executing the program by one or more processors in a computer of the system or the device. Further, embodiment(s) of the present invention can be also implemented by a circuit (e.g., an ASIC) configured to implement one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045250, filed Mar. 9, 2017, which is hereby incorporated by reference herein in its entirety.

What is claimed is:

1. An image processing device comprising:
circuitry configured to
divide a first image into a plurality of regions,
extract a feature point from each of the regions,
track the feature point among a plurality of images to detect a motion vector,
estimate a notable target of the first image,
calculate a priority level of setting of a tracking feature point for each of the regions for tracking motion of the notable target, and
set the tracking feature point to one of the regions based on the priority level,
wherein the circuitry calculates reliability of tracking of the feature point, thereby setting, in descending order of the priority level of the each of the regions, a feature point newly extracted from a region, of the plurality of regions, with higher reliability as the tracking feature point instead of a feature point with reliability lower than a predetermined threshold.

2. The image processing device according to claim 1, wherein
the circuitry estimates the notable target based on at least one of image capturing mode information, main object information, shutter speed information, focal length information, depth information, inertial sensor information, and user instruction information.

3. The image processing device according to claim 2, wherein
the circuitry calculates a background level and an object level for the notable target upon image capturing based on at least one of the image capturing mode information, the main object information, the shutter speed information, the focal length information, the depth information, the inertial sensor information, and the user instruction information.

4. The image processing device according to claim 3, wherein
the circuitry performs weight summing for multiple background levels and multiple object levels, thereby calculating a final background level and a final object level.

5. The image processing device according to claim 4, wherein
the circuitry compares the background level and the object level with each other to estimate a background as the notable target when the background level is greater and to estimate an object as the notable target when the object level is greater.

6. The image processing device according to claim 1, wherein
the circuitry calculates the priority level by a first calculation method for calculating a higher priority level of setting of the tracking feature point for a predetermined region, of the plurality of regions, as the number of feature points in the predetermined region and a region, of the plurality of regions, around the predetermined region decreases.

7. The image processing device according to claim 6, wherein
the circuitry calculates the priority level by the first calculation method in a case where a background is estimated as the notable target.

8. The image processing device according to claim 1, wherein
the circuitry calculates the priority level by a second calculation method for calculating a higher priority level of setting of the tracking feature point for a predetermined region, of the plurality of regions, as a distance between a representative position of the predetermined region and a representative position of a main object region, of the plurality of regions, decreases.

9. The image processing device according to claim 8, wherein
the circuitry calculates the priority level by the second calculation method in a case where an object is estimated as the notable target.

10. The image processing device according to claim 1, wherein
the circuitry calculates reliability of tracking of the feature point, thereby calculating a higher priority level of setting of the tracking feature point for a region, of the plurality of regions, having more feature points with high reliability.

11. The image processing device according to claim 1, wherein
the circuitry calculates reliability of tracking of the feature point based on a result of calculation of a correlation evaluation value obtained upon detection of the motion vector, and sets the tracking feature point one of the regions based on the reliability and the priority level.

12. The image processing device according to claim 11, wherein
the circuitry performs weight summing for multiple reliabilities of tracking of the feature point, thereby calculating final reliability of tracking of the feature point.

13. The image processing device according to claim 1, wherein
the circuitry calculates high reliability of tracking of the feature point as an amount of change in a feature amount of the feature point before and after tracking of the feature point decreases, and sets the tracking feature point to one of the regions based on the reliability and the priority level.

14. An image processing method comprising:
dividing a first image into a plurality of regions;
extracting a feature point from each of the regions;
tracking the feature point among a plurality of images to detect a motion vector;
estimating a notable target of the first image;
calculating a priority level of setting of a tracking feature point for each of the regions for tracking motion of the notable target;
setting the tracking feature point to one of the regions based on the priority level; and
calculating reliability of tracking of the feature point, thereby setting, in descending order of the priority level of the each of the regions, a feature point newly extracted from a region, of the plurality of regions, with higher reliability as the tracking feature point instead of a feature point with reliability lower than a predetermined threshold.

15. A non-transitory computer-readable non-volatile storage medium storing a program for causing a computer to execute each step of an image processing method, wherein the image processing method including a region division step of dividing a first image into a plurality of regions;
a feature point extraction step of extracting a feature point from each of the regions;
a vector detection step of tracking the feature point among a plurality of images to detect a motion vector;
a notable target estimation step of estimating a notable target of the first image;
a priority level calculation step of calculating a priority level of setting of a tracking feature point for each of the regions for tracking motion of the notable target by means of output at the notable target estimation step; and
a feature point compensation step of setting the tracking feature point to one of the regions based on the priority level; and
a reliability calculation step of calculating reliability of tracking of the feature point, thereby setting, in descending order of the priority level of the each of the regions, a feature point newly extracted from a region, of the plurality of regions, with higher reliability as the tracking feature point instead of a feature point with reliability lower than a predetermined threshold.

* * * * *